(12) United States Patent
Tsuji et al.

(10) Patent No.: US 9,506,778 B2
(45) Date of Patent: Nov. 29, 2016

(54) LINEAR ENCODER

(71) Applicant: MITUTOYO CORPORATION, Kawasaki, Kanagawa (JP)

(72) Inventors: Shozaburo Tsuji, Kanagawa (JP); Fujio Maeda, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 104 days.

(21) Appl. No.: 14/609,802

(22) Filed: Jan. 30, 2015

(65) Prior Publication Data
US 2015/0219475 A1 Aug. 6, 2015

(30) Foreign Application Priority Data

Feb. 4, 2014 (JP) ................. 2014-019408

(51) Int. Cl.
| | |
|---|---|
| *G01D 5/347* | (2006.01) |
| *G01D 5/20* | (2006.01) |
| *G01D 5/24* | (2006.01) |
| *G01D 5/244* | (2006.01) |

(52) U.S. Cl.
CPC .......... *G01D 5/34746* (2013.01); *G01D 5/20* (2013.01); *G01D 5/24* (2013.01); *G01D 5/24438* (2013.01); *G01D 5/34753* (2013.01)

(58) Field of Classification Search
CPC .................................................. G01D 5/34746
USPC .......................................... 33/706, 707, 708
See application file for complete search history.

(56) References Cited

U.S. PATENT DOCUMENTS

| | | | | |
|---|---|---|---|---|
| 4,149,319 A * | 4/1979 | Nelle | ........... | F16C 29/00 33/706 |
| 4,400,890 A * | 8/1983 | Ohkubo | ........... | G01B 7/02 33/708 |
| 4,603,480 A | 8/1986 | Sakagami | | |
| 2002/0066201 A1 | 6/2002 | Boge et al. | | |
| 2007/0125939 A1* | 6/2007 | Yaku | ........... | G01D 5/34746 250/231.16 |
| 2008/0316493 A1* | 12/2008 | Maeda | ........... | G01D 5/38 356/445 |
| 2012/0085897 A1* | 4/2012 | Kato | ........... | G01D 5/24476 250/231.1 |
| 2013/0127644 A1* | 5/2013 | Aoki | ........... | G01D 5/34707 341/13 |
| 2013/0206970 A1* | 8/2013 | Tahara | ........... | G01D 5/34746 250/231.1 |

(Continued)

FOREIGN PATENT DOCUMENTS

| | | |
|---|---|---|
| EP | 2233893 | 9/2010 |
| EP | 2538180 | 12/2012 |
| JP | 4-102423 | 9/1992 |

OTHER PUBLICATIONS

European Search Report dated May 27, 2015, 6 pages.

*Primary Examiner* — G. Bradley Bennett
(74) *Attorney, Agent, or Firm* — Rankin, Hill & Clark LLP

(57) ABSTRACT

A linear encoder includes a plate-type scale and a head which moves along the longitudinal direction of the scale. The scale has graduations formed on a surface of the scale and arranged along the longitudinal direction of the scale. The head includes a reading part which detects an amount of a relative movement of the head with respect to the scale by reading graduations formed on the scale. The head includes four bearings each having a rotation axis extending along the transverse direction of the scale. Each of the bearings is situated on the head so as to abut against a surface of the scale, to function as a spacer to maintain a distance between the scale and the head. The scale acts as a plate member interposed between the reading part and the graduations.

6 Claims, 8 Drawing Sheets

(56) References Cited

U.S. PATENT DOCUMENTS

| | | | |
|---|---|---|---|
| 2015/0192435 A1* | 7/2015 | Kurpan | G01P 3/38 250/231.1 |
| 2015/0219434 A1* | 8/2015 | Tsuji | G01B 7/003 324/207.17 |
| 2016/0011017 A1* | 1/2016 | Hayashi | G01D 5/34753 33/707 |
| 2016/0146641 A1* | 5/2016 | Bauer | G01D 5/34715 33/706 |
| 2016/0153812 A1* | 6/2016 | Kato | G01D 5/36 250/231.1 |

* cited by examiner

LINEAR ENCODER

CROSS-REFERENCE TO RELATED APPLICATION

This non-provisional application claims priority under 35 U.S.C. §119(a) from Japanese Patent Application No. 2014-019408, filed on Feb. 4, 2014, the entire contents of which are incorporated herein by reference.

BACKGROUND OF THE INVENTION

Field of the Invention

The present invention relates to a linear encoder.

Description of the Related Art

It is known that a linear encoder conventionally includes a plate-type scale and a head which moves along the longitudinal direction of the scale. The scale has graduations formed on a surface thereof. The graduations are arranged along the longitudinal direction of the scale. The head has a reading part which detects an amount of a relative movement of the head with respect to the scale by reading the graduations formed on the scale.

For example, a scale apparatus (a linear encoder) described in JP 04-102423 Y includes a scale and a detection head. The detection head includes a movable member such as a bearing, which is situated so as to abut against a surface of the scale. With this configuration, the detection head is able to move smoothly along the longitudinal direction of the scale.

The movable member also functions as a spacer to maintain a distance between the scale and the detection head.

For a linear scale, as a method by which a reading part of a head reads graduations formed on a scale, an electromagnetic induction method, a capacitance method, a photoelectric method, and the like are applicable. Whatever method is used, a distance between the graduations formed on the scale and the reading part situated on the head is desirably small, because reducing the above distance improves the accuracy of detecting an amount of a relative movement of the head with respect to the scale. In the scale apparatus described in JP 04-102423 Y, an electromagnetic induction method is applied as a method by which the detection head reads the graduations formed on the scale.

FIG. 6 is a diagram illustrating a conventional linear encoder. FIG. 7 is a lateral view of the conventional linear encoder. More specifically, FIG. 6 illustrates the linear encoder as viewed from the scale side, and FIG. 7 illustrates the linear encoder of FIG. 6 as viewed from the upper side of FIG. 6.

As shown in FIGS. 6 and 7, the conventional linear encoder 100 includes a plate-type scale 110, and a head 120 configured to move along the longitudinal direction of the scale 110 (the right-left direction in FIGS. 6 and 7).

The scale 110 has graduations 111 formed on a surface thereof (a surface on the head 120 side). The graduations 111 are arranged along the longitudinal direction of the scale 110. The graduations 111 are formed of a pattern of annular-shaped scale coils 111A regularly arrayed at predetermined pitch along the longitudinal direction of the scale 110. The scale 110 is made of glass. Also, the scale coils 111A are formed in rows of three as counted in the transverse direction of the scale 110.

The head 120 has a reading part 121 configured to detect an amount of a relative movement of the head 120 with respect to the scale 110 by reading the graduations 111 formed on the scale 110. The reading part 121 includes an excitation coil 121A formed in a substantially annular shape, and a plurality of detection coils 121B formed inside the excitation coil 121A. The excitation coil 121A is formed in a substantially elliptic shape having a long axis extending along the longitudinal direction of the scale 110. Further, the excitation coil 121A enclosing the detection coils 121B are formed in rows of three as counted in the transverse direction of the scale 110.

In the above linear encoder 100, when an electric current is applied to the excitation coil 121A, an electromotive current is generated in the scale coil 111A forming the graduations 111, and subsequently in the detection coil 121B. Then, when the head 120 moves with respect to the scale 110, electromagnetic couplings among the coils 111A, 121A, and 121B change depending on an amount of a movement of the head 120. Based on this, the linear encoder 100 detects a sinusoidal signal with a period equal to the pitch of the scale coils 111A, through the detection coil 121B. By reference to the sinusoidal signal, the linear encoder 100 detects an amount of a relative movement of the head 120 with respect to the scale 110. In other words, the linear encoder 100 is configured as a linear encoder of electromagnetic induction type.

FIG. 8 is an exploded perspective view of the conventional linear encoder, showing a scale and a head in separated positions.

The head 120 includes, as shown in FIGS. 6 to 8, three bearings 122 each having a rotation axis extending along the transverse direction of the scale 110, and two bearings 123 each having a rotation axis extending along a direction in which the scale 110 and the head 120 face each other. The head 120 is placed in such a manner that a peripheral surface of the bearing 122 is pressed against a surface of the scale 110, and at the same time a peripheral surface of the bearing 123 is pressed against a lateral surface of the scale 110.

As shown in FIG. 7, each of the bearings 122 is situated on the head 120 so as to project above the reading part 121 toward the scale 110. This means the bearing 122 functions as a spacer which maintains a distance between the scale 110 and the head 120 by abutting against the surface of the scale 110.

With this configuration, when the head 120 moves with respect to the scale 110, the bearing 122 rolls on the surface of the scale 110. In the linear encoder 100, therefore, as shown in FIG. 6, a path of the bearing 122 is spaced apart from the graduations 111. This prevents the bearing 122 from making contact with the graduations 111 when rolling. If the bearing 122 touches the graduations 111, the bearing 122 may damage the graduations 111, or a distance between the graduations 111 and the reading part 121 changes due to an uneven surface caused by the graduations 111, which decreases the measurement accuracy of the linear encoder 100.

SUMMARY OF THE INVENTION

On the other hand, transverse lengths of the scale 110 and the head 120 become longer, in order to place the bearing 122 such that the path of the bearing 122 is spaced apart from the graduations 111. As a result, the entire size of the linear encoder 100 becomes undesirably large.

In view of the above problem, it is an objective of the present invention to provide a linear encoder, the entire size of which is able to be reduced by reducing transverse lengths of a scale and a head included in the linear encoder.

The linear encoder according to an embodiment of the present invention includes a plate-type scale with graduations formed on a surface of the scale. The graduations are formed along the longitudinal direction of the scale. The linear encoder also includes a head configured to move along the longitudinal direction of the scale. The head has a reading part configured to detect an amount of a relative movement of the head with respect to the scale by reading the graduations formed on the scale. The head includes a spacer configured to maintain a distance between the scale and the head by abutting against a surface of the scale. The scale includes a plate member interposed between the graduations and the reading part. The spacer is situated on the head so as to abut against a surface of the plate member.

According to such a configuration, the spacer does not make contact with the graduations even if a path of the spacer and the graduations are arranged close to each other, as the spacer is situated on the head so as to abut against the surface of the plate member. In such linear encoder, therefore, the spacer is able to be situated in such a manner that a path of the spacer and the graduations are arranged close to each other, without damaging the graduations or reducing measurement accuracy. This makes it possible to reduce transverse lengths of the scale and the head in the linear encoder. As a result, the entire size of the linear encoder is able to be reduced.

In a preferred embodiment of the present invention, the spacer is situated on the head in such a manner that a path of the spacer and the graduations overlap each other.

According to such a configuration, it is possible to further reduce transverse lengths of the scale and the head in the linear encoder, as the spacer is situated on the head in such a manner that a path of the spacer and the graduations overlap each other. As a result, the entire size of the linear encoder is able to be further reduced.

In a preferred embodiment of the present invention, the graduations are formed on a surface on one side of the scale, while the spacer abuts against a surface on the other side of the scale, so that the scale can serve as a plate member.

According to such a configuration, since the scale serves as a plate member, it is possible to avoid adding a new member, as well as to reduce transverse lengths of the scale and the head in the linear encoder. As a result, the entire size of the linear encoder is able to be reduced.

In a preferred embodiment of the present invention, a plate member is attached to the scale so as to cover the graduations, so that the plate member can be interposed between the reading part and the graduations.

According to such a configuration, the linear encoder is able to be designed more flexibly, as materials for the scale and the plate member can be selected separately.

In a preferred embodiment of the present invention, the plate member is made of glass.

According to such a configuration, in the linear encoder, a distance between the reading part and the graduations is stable while the head moves with respect to the scale, since glass provides superior flatness to other materials. As a consequence, the linear encoder improves measurement accuracy.

In a preferred embodiment of the present invention, the reading part reads the graduations by means of electromagnetic induction.

According to such a configuration, the linear encoder, which is of an electromagnetic induction type, is able to maintain high detection accuracy even if a distance between the reading part and the graduations is increased, compared with linear encoders of a capacitance type and a photoelectric type. As a consequence, the entire size of the linear encoder is able to be reduced by reducing transverse lengths of the scale and the head, without decreasing the measurement accuracy of the linear encoder.

DETAILED DESCRIPTION OF THE EMBODIMENTS

First Embodiment

Hereinafter, a first embodiment of the present invention will be described with reference to the drawings.

Figure 1:
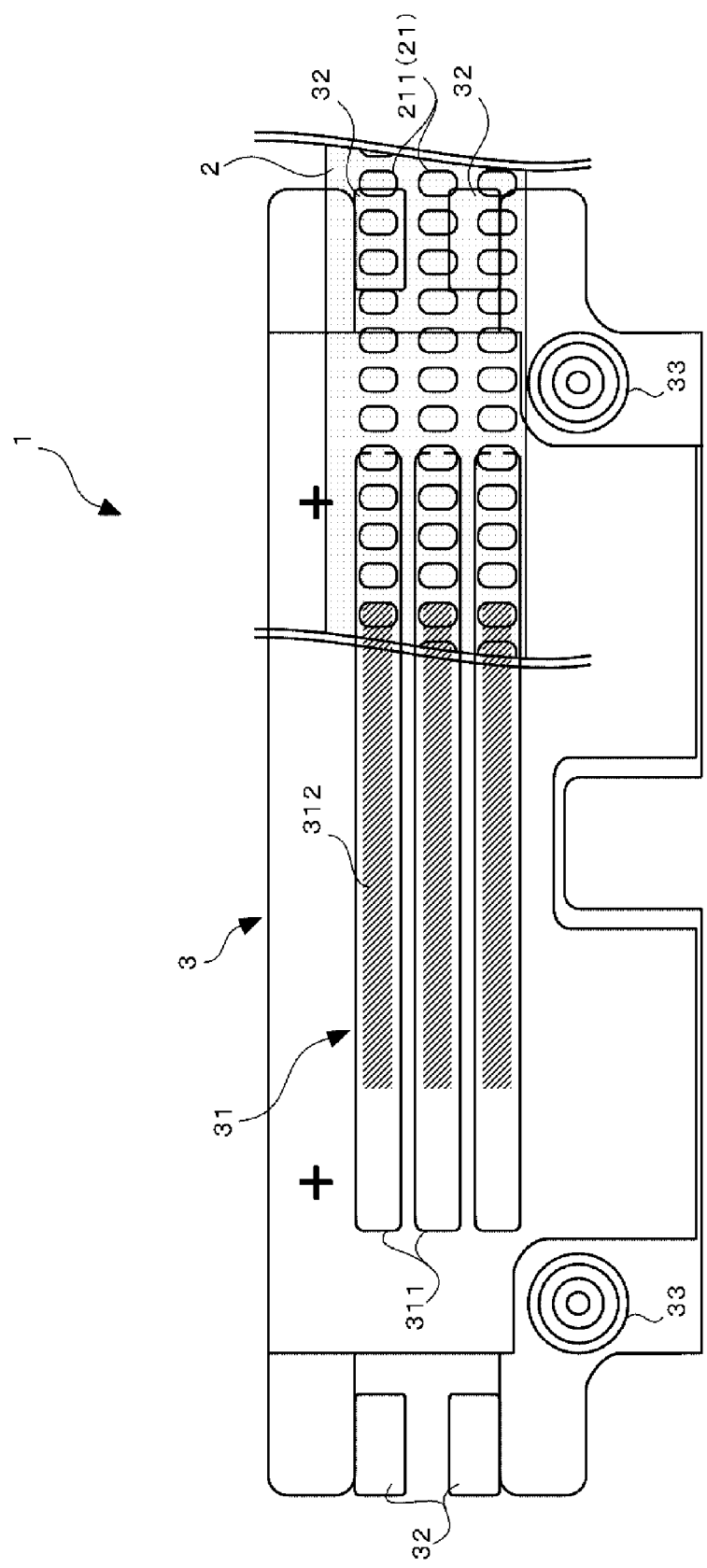
FIG. 1 is a diagram illustrating a linear encoder according to a first embodiment of the present invention.
Figure 2:
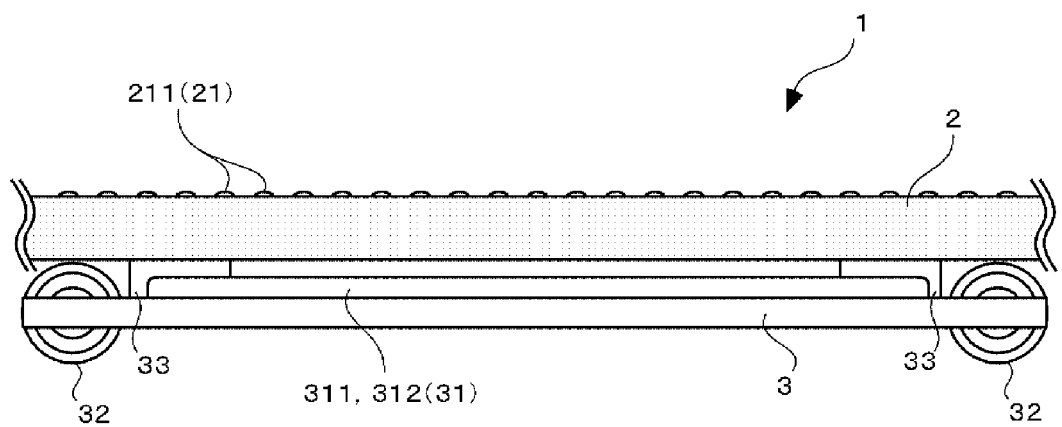
FIG. 2 is a lateral view of the linear encoder.

FIG. 1 is a diagram illustrating a linear encoder according to a first embodiment of the present invention. FIG. 2 is a lateral view of the linear encoder. More specifically, FIG. 1 illustrates the linear encoder as viewed from the scale side, and FIG. 2 illustrates the linear encoder of FIG. 1 as viewed from the upper side of FIG. 1.

The linear encoder 1 includes, as shown in FIGS. 1 and 2, a plate-type scale 2, and a head 3 configured to move along the longitudinal direction of the scale 2 (the right-left direction in FIGS. 1 and 2).

The scale 2 has graduations 21 formed on a surface thereof (a surface on a side opposite to the head 3 side). The graduations 21 are arranged along the longitudinal direction of the scale 2. The graduations 21 are formed of a pattern of annular-shaped scale coils 211 regularly arrayed at predetermined pitch along the longitudinal direction of the scale 2. The scale 2 is made of glass. Also, the scale coils 211 are formed in rows of three as counted in the transverse direction of the scale 2.

The head 3 has a reading part 31 configured to detect an amount of a relative movement of the head 3 with respect to the scale 2 by reading the graduations 21 formed on the scale 2. The reading part 31 is situated on a surface of the head 3 (a surface on the scale 2 side). The reading part 31 includes an excitation coil 311 formed in a substantially annular shape, and a plurality of detection coils 312 formed inside the excitation coil 311. This means the reading part 31 is configured to read the graduations 21 by means of electromagnetic induction. The excitation coil 311 is formed in a substantially elliptic shape having a long axis extending along the longitudinal direction of the scale 2. Further, the excitation coil 311 enclosing the detection coils 312 are formed in rows of three as counted in the transverse direction of the scale 2.

Figure 3:
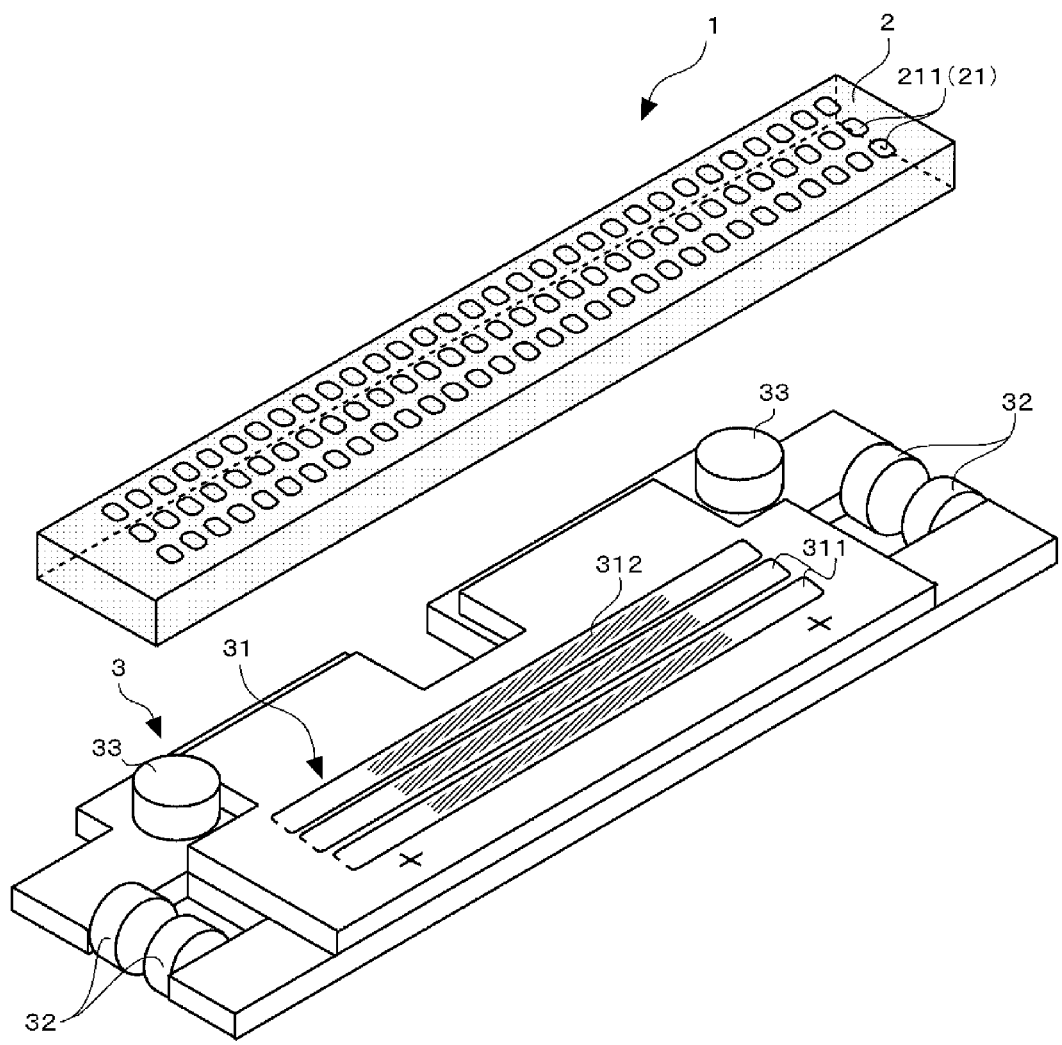
FIG. 3 is an exploded perspective view of the linear encoder, showing a scale and a head in separated positions.

FIG. 3 is an exploded perspective view of the linear encoder, showing the scale and the head in separated positions.

The head 3 includes, as shown in FIGS. 1 to 3, four bearings 32 each having a rotation axis extending along the transverse direction of the scale 2, and two bearings 33 each having a rotation axis extending along a direction in which the scale 2 and the head 3 face each other. The head 3 is placed in such a manner that a peripheral surface of the bearing 32 is pressed against a surface of the scale 2, and at the same time a peripheral surface of the bearing 33 is pressed against a lateral surface of the scale 2.

As shown in FIG. 2, each of the bearings 32 is situated on the head 3 so as to project above the reading part 31 toward the scale 2. This means the bearing 32 functions as a spacer to maintain a distance between the scale 2 and the head 3 by abutting against the surface of the scale 2.

Each of the bearings 32 is situated, as shown in FIG. 1, in such a manner that a path of the bearing 32 and the graduations 21 overlap each other. Moreover, in the linear encoder 1, as shown in FIG. 2, the graduations 21 are formed on a surface on one side of the scale 2 (a surface on a side opposite to the head 3 side), while the bearing 32 abuts against a surface on the other side of the scale 2 (a surface on the head 3 side). In other words, in the linear encoder 1, the scale 2 serves as a plate member interposed between the reading part 31 and the graduations 21. Therefore, when the head 3 moves with respect to the scale 2, the bearing 32 rolls on the surface of the scale 2 on the opposite side to the surface on which the graduations 21 are formed.

In the foregoing embodiment, the following working effects are produced.

(1) In the linear encoder 1, the graduations 21 are formed on a surface on one side of the scale 2, while the bearing 32 abuts against a surface on the other side of the scale 2. Accordingly, the bearing 32 does not make contact with the graduations 21, even if a path of the bearing 32 and the graduations 21 are arranged close to each other. In such linear encoder 1, therefore, the bearing 32 is able to be situated in such a manner that a path of the bearing 32 and the graduations 21 are arranged close to each other, without damaging the graduations 21 or reducing measurement accuracy. This makes it possible to reduce transverse lengths of the scale 2 and the head 3 in the linear encoder 1. As a result, the entire size of the linear encoder 1 is able to be reduced.

(2) As each of the bearings 32 is situated on the head in such a manner that a path of the bearing 32 and the graduations 21 overlap each other, it is possible to further reduce transverse lengths of the scale 2 and the head 3 in the linear encoder 1. As a result, the entire size of the linear encoder 1 is able to be further reduced.

(3) In the linear encoder 1, the graduations 21 are formed on a surface on one side of the scale 2, while the bearing 32 abuts against a surface on the other side of the scale 2, whereby the scale 2 serves as a plate member. This makes it possible to avoid adding a new member, as well as to reduce transverse lengths of the scale 2 and the head 3 in the linear encoder 1. As a result, the entire size of the linear encoder 1 is able to be reduced.

(4) As the reading part 31 is configured to read the graduations 21 by means of electromagnetic induction, it is possible to reduce transverse lengths of the scale 2 and the head 3 in the linear encoder 1, and accordingly to reduce the entire size of the linear encoder 1, without decreasing the measurement accuracy of the linear encoder 1.

Second Embodiment

Hereinafter, a second embodiment of the present invention will be described with reference to the drawings. In the following description, previously described features will be denoted by the same reference signs as used in the preceding descriptions, and will not be discussed repeatedly.

Figure 4:
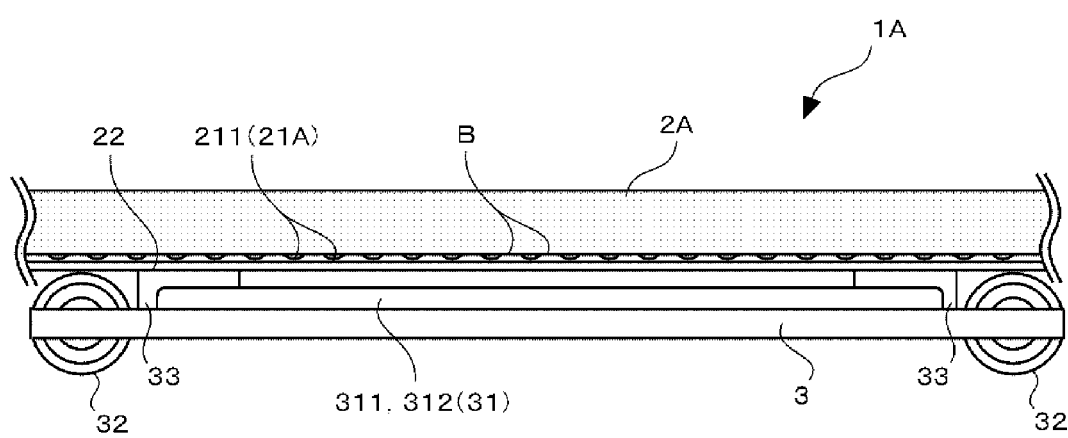
FIG. 4 is a lateral view of a linear encoder according to a second embodiment of the present invention.

FIG. 4 is a lateral view of a linear encoder according to the second embodiment of the present invention.

In the linear encoder 1 of the first embodiment, the graduations 21 are formed on a surface on one side of the scale 2, while the bearing 32 abuts against a surface on the other side of the scale 2, whereby the scale 2 serves as a plate member interposed between the reading part 31 and the graduations 21.

As shown in FIG. 4, the second embodiment is different from the first embodiment in that the linear encoder 1A includes a scale 2A having graduations 21A formed on a surface of the scale 2A (a surface on a head 3 side) and arranged along the longitudinal direction of the scale 2A, and a plate member 22 interposed between the reading part 31 and the graduations 21A. Furthermore, each bearing 32 is situated on the head 3 so as to abut against a surface of the plate member 22.

The plate member 22 is made of glass, and is attached to the scale 2A via an adhesive B so as to cover the graduations 21A.

The scale 2A may have a pattern of protrusions other than the graduations 21A. The protrusions are formed to be the same in thickness as the graduations 21A, and arranged laterally outside the graduations 21A. With such protrusions, the scale 2A and the plate member 22 are joined parallel to each other securely.

In the second embodiment, working effects similar to those in (2) and (4) in the description of the first embodiment are produced. In addition, the second embodiment has the following working effects.

(5) As the bearing 32 is situated on the head 3 so as to abut against a surface of the plate member 22, the bearing 32 does not make contact with the graduations 21A even if a path of the bearing 32 and the graduations 21A are arranged close to each other. In such linear encoder 1A, therefore, the bearing 32 is able to be situated in such a manner that a path of the bearing 32 and the graduations 21A are arranged close to each other, without damaging the graduations 21A or reducing measurement accuracy. This makes it possible to reduce transverse lengths of the scale 2A and the head 3 in the linear encoder 1A. As a result, the entire size of the linear encoder 1A is able to be reduced.

(6) The linear encoder 1A is able to be designed more flexibly, as materials for the scale 2A and the plate member 22 can be selected separately.

(7) In the linear encoder 1A, as the plate member 22 is made of glass, a distance between the reading part 31 and the graduations 21A is stable while the head 3 moves with respect to the scale 2A. As a consequence, the linear encoder 1A improves measurement accuracy.

Third Embodiment

Hereinafter, a third embodiment of the present invention will be described with reference to the drawings. In the following description, previously described features will be denoted by the same reference signs as used in the preceding descriptions, and will not be discussed repeatedly.

Figure 5:
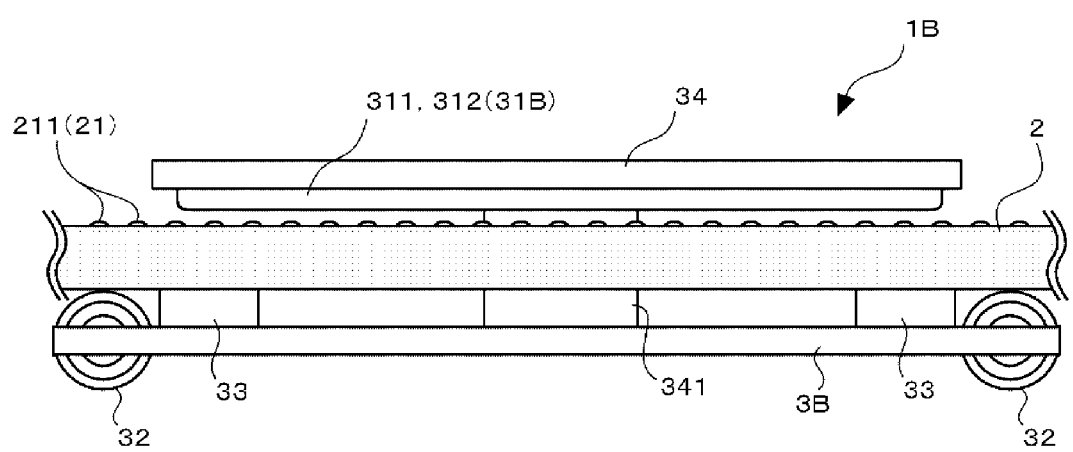
FIG. 5 is a lateral view of a linear encoder according to a third embodiment of the present invention.
Figure 6:
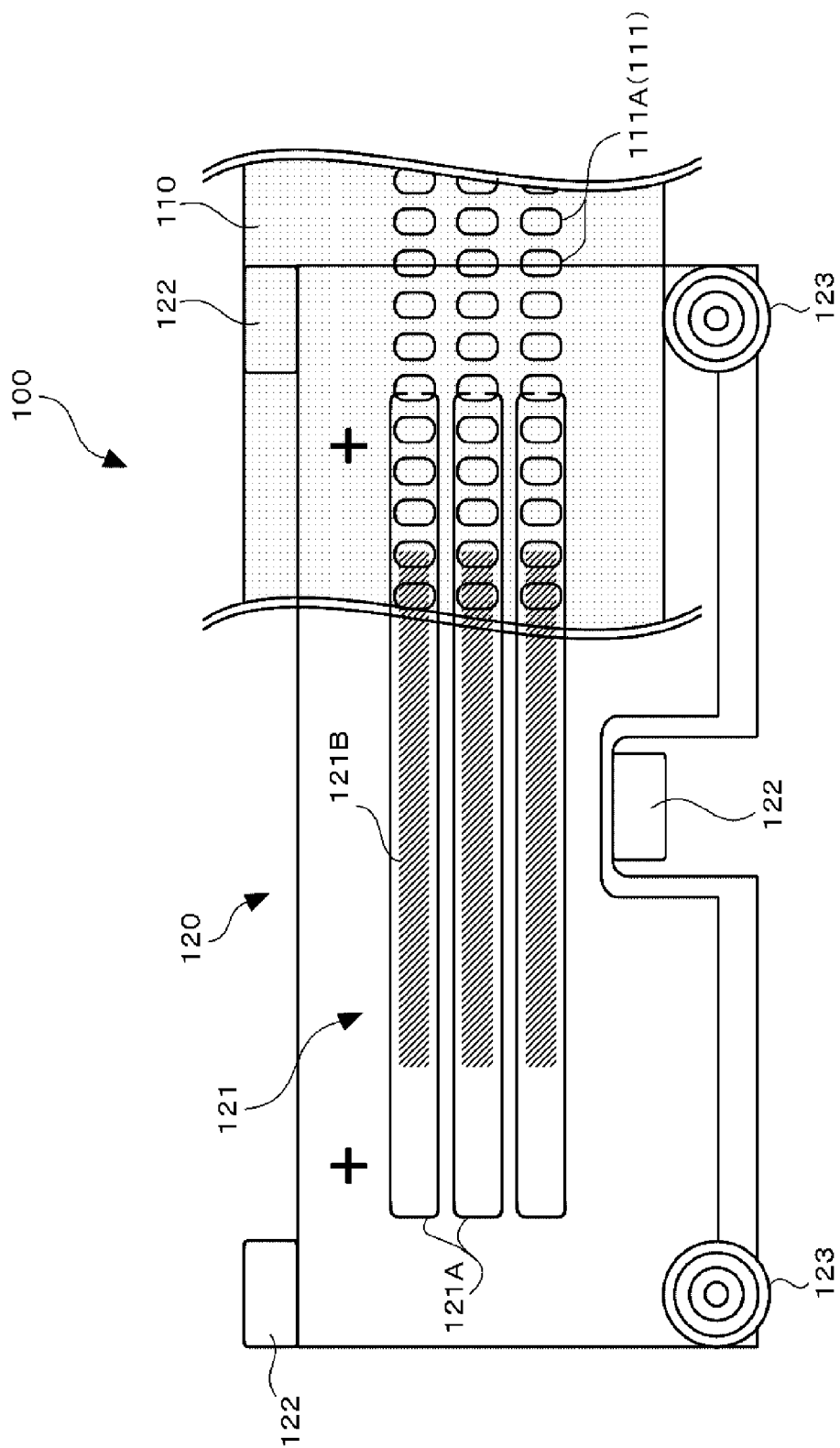
FIG. 6 is a diagram illustrating a conventional linear encoder.
Figure 7:
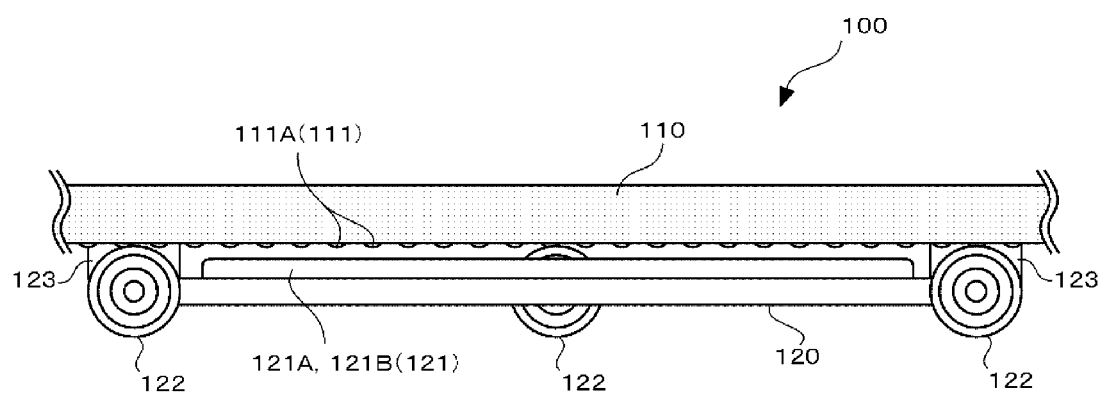
FIG. 7 is a lateral view of the conventional linear encoder.
Figure 8:
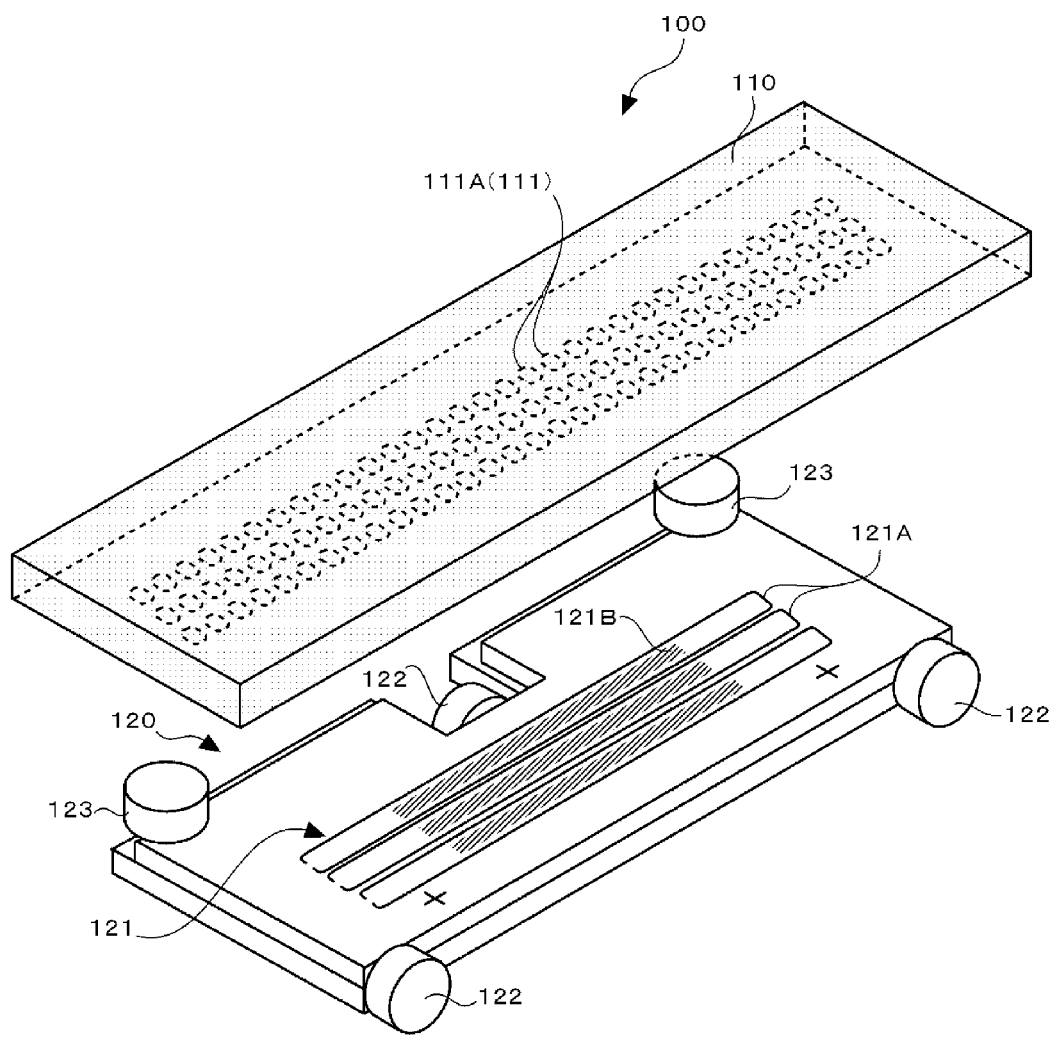
FIG. 8 is an exploded perspective view of the conventional linear encoder, showing a scale and a head in separated positions.

FIG. 5 is a lateral view of a linear encoder according to the third embodiment of the present invention.

In the first embodiment, the linear encoder 1 includes the head 3 having the reading part 31. The reading part 31 is formed on a surface of the head 3 (a surface on the scale 2 side).

In the third embodiment, a linear encoder 1B includes a head 3B having a reading part 31B. Different from the first embodiment, however, the head 3B has a plate 34 placed so as to face a surface of a scale 2 on which graduations 21 are formed. The reading part 31B is formed on the scale 2 side surface of the plate 34. The plate 34 is fixed to the head 3B via a support 341 situated so as not to come in contact with the scale 2.

In the third embodiment, working effects similar to those in (1), (2), and (4) in the description of the first embodiment are produced. In addition, the third embodiment has the following working effect.

(8) In the linear encoder 1B, the graduations 21 are formed on a surface on one side of the scale 2, while the bearing 32 abuts against a surface on the other side of the scale 2, whereby the scale 2 serves as a plate member. This makes it possible to reduce transverse lengths of the scale 2 and the head 3 in the linear encoder 1B. As a result, the entire size of the linear encoder 1B is able to be reduced.

Variations of Embodiments

The present invention is not limited to the previously described embodiments. The present invention encompasses any alterations and modifications which fall within the scope of accomplishment of the objective(s) thereof.

For example, in the foregoing embodiments, the bearing 32 serves as a spacer to maintain a distance between the scale 2, 2A and the head 3, 3B, by abutting against a surface of the scale 2, 2A. However, the spacer is not necessarily be a bearing. The spacer may be a plastic column and the like.

In the foregoing embodiments, the bearing 32 is placed in such a manner that a path of the bearing 32 and the graduations 21, 21A overlap each other. However, the bearing 32 may be placed in such a manner that a path of the bearing 32 and the graduations 21, 21A do not overlap each other.

In the foregoing embodiments, the reading part 31, 31B is configured to read the graduations 21, 21A by means of electromagnetic induction. However, the reading part 31, 31B may be configured to read the graduations 21, 21A by a different method, such as measurement by means of capacitance.

In the second embodiment, the plate member 22 is made of glass. However, a material other than glass may be applied to the plate member 22.

INDUSTRIAL APPLICABILITY

As heretofore described, the present invention is suitably applicable to a linear encoder.

What is claimed is:

1. A linear encoder comprising:
a plate-type scale with graduations formed on a surface of the scale so as to be arranged along a longitudinal direction of the scale; and
a head configured to move along the longitudinal direction of the scale, the head having a reading part configured to detect an amount of a relative movement of the head with respect to the scale by reading the graduations formed on the scale, wherein
the head includes a spacer configured to maintain a distance between the scale and the head by abutting against a surface of the scale,
the scale includes a plate member interposed between the reading part and the graduations,
the spacer is situated on the head so as to abut against a surface of the plate member, and
the graduations are in direct contact with the plate member.

2. The linear encoder according to claim 1, wherein the spacer is situated on the head in such a manner that a path of the spacer and the graduations overlap each other.

3. The linear encoder according to claim 1, wherein the graduations are formed on a surface on one side of the scale, while the spacer abuts against a surface on the other side of the scale, so that the scale serves as the plate member.

4. The linear encoder according to claim 1, wherein the plate member is attached to the scale so as to cover the graduations, so that the plate member is interposed between the reading part and the graduations.

5. The linear encoder according to claim 4, wherein the plate member is made of glass.

6. The linear encoder according to claim 1, wherein the reading part reads the graduations by way of electromagnetic induction.

* * * * *